US010239464B1

(12) United States Patent
Dunn

(10) Patent No.: US 10,239,464 B1
(45) Date of Patent: Mar. 26, 2019

(54) WHEEL STABILIZING ASSEMBLY FOR A PICK-UP TRUCK

(71) Applicant: Dennis F. Dunn, Las Vegas, NV (US)

(72) Inventor: Dennis F. Dunn, Las Vegas, NV (US)

( * ) Notice: Subject to any disclaimer, the term of this patent is extended or adjusted under 35 U.S.C. 154(b) by 0 days.

(21) Appl. No.: 15/412,033

(22) Filed: Jan. 22, 2017

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................................. B60R 9/10; B60R 9/06
USPC ....................................................... 224/403
See application file for complete search history.

(56) References Cited

U.S. PATENT DOCUMENTS

| 3,430,983 | A | * | 3/1969 | Jones | B60P 3/07 280/292 |
|---|---|---|---|---|---|
| 3,785,517 | A | | 1/1974 | Brajkovich | |
| 4,057,182 | A | | 11/1977 | Kolkhorst et al. | |
| 4,437,597 | A | * | 3/1984 | Doyle | B60R 9/10 211/20 |
| 4,834,572 | A | * | 5/1989 | Harrington | B65D 90/0013 24/287 |
| 4,934,572 | A | * | 6/1990 | Bowman | B60R 9/00 211/17 |
| 5,037,019 | A | * | 8/1991 | Sokn | B60R 9/00 224/403 |
| 5,092,504 | A | | 3/1992 | Hannes et al. | |
| 5,427,286 | A | | 6/1995 | Hagerty | |
| 5,516,020 | A | | 5/1996 | Lawler et al. | |
| 5,560,526 | A | * | 10/1996 | Jantzen | B60R 9/10 211/19 |
| 6,179,181 | B1 | | 1/2001 | Johnson et al. | |
| 6,241,104 | B1 | * | 6/2001 | Kraus | B62H 3/04 211/20 |
| 6,640,979 | B1 | * | 11/2003 | Mayfield | B62H 3/00 211/20 |
| 6,679,408 | B1 | * | 1/2004 | Thomas | B60P 3/075 224/403 |
| 6,698,994 | B2 | * | 3/2004 | Barrett | B60P 3/07 414/462 |

(Continued)

OTHER PUBLICATIONS

U.S. RACK We Build America's Finest Truck Racks! | Motorcycle Truck Racks | printout of website located at: https://www.usrack.com/responsive/motorcycle-truck-racks.php, obtained on Nov. 16, 2016.

*Primary Examiner* — Peter Helvey
(74) *Attorney, Agent, or Firm* — Hanrahan Law Firm, P.A.; Benjamin M. Hanrahan

(57) ABSTRACT

A wheel/tire stabilizing assembly that can be removably mountable to a rear (or other) wall of a pickup truck bed is presented herein. The assembly can be used to facilitate the hauling of a wheeled vehicle (e.g., a motorcycle or bicycle) in the pickup truck bed, for example, by engaging or receiving one or more wheels/tires for stabilization. The assembly includes a wheel bracket and a mounting clamp adjustably interconnected or fastened to one another which can be clamped to the support surface. The mounting clamp may be moved or adjusted relative to the wheel bracket to fit or clamp to support surfaces having different widths or dimensions. The wheel bracket includes a pair of extension arms extending outward in a laterally spaced relation to one another defining a wheel receiving space.

19 Claims, 6 Drawing Sheets

(56) References Cited

U.S. PATENT DOCUMENTS

| | | | |
|---|---|---|---|
| 6,848,873 B1 * | 2/2005 | Husk | B60R 9/10 |
| | | | 410/106 |
| 6,866,282 B2 * | 3/2005 | Heerspink | B62H 3/08 |
| | | | 211/20 |
| 7,051,909 B2 | 5/2006 | Gibson | |
| 7,641,086 B2 | 1/2010 | Green | |
| 8,118,202 B1 * | 2/2012 | Price | B60P 7/0807 |
| | | | 224/403 |
| 2002/0066761 A1 | 6/2002 | Vining et al. | |
| 2004/0262347 A1 | 12/2004 | Green | |
| 2008/0050212 A1 | 2/2008 | Ormsby | |
| 2009/0232628 A1 | 9/2009 | Miller | |
| 2011/0284603 A1 | 11/2011 | Reyes | |
| 2015/0217698 A1 | 8/2015 | Evans | |
| 2015/0329059 A1 * | 11/2015 | Jobe | B60R 9/06 |
| | | | 224/403 |

* cited by examiner

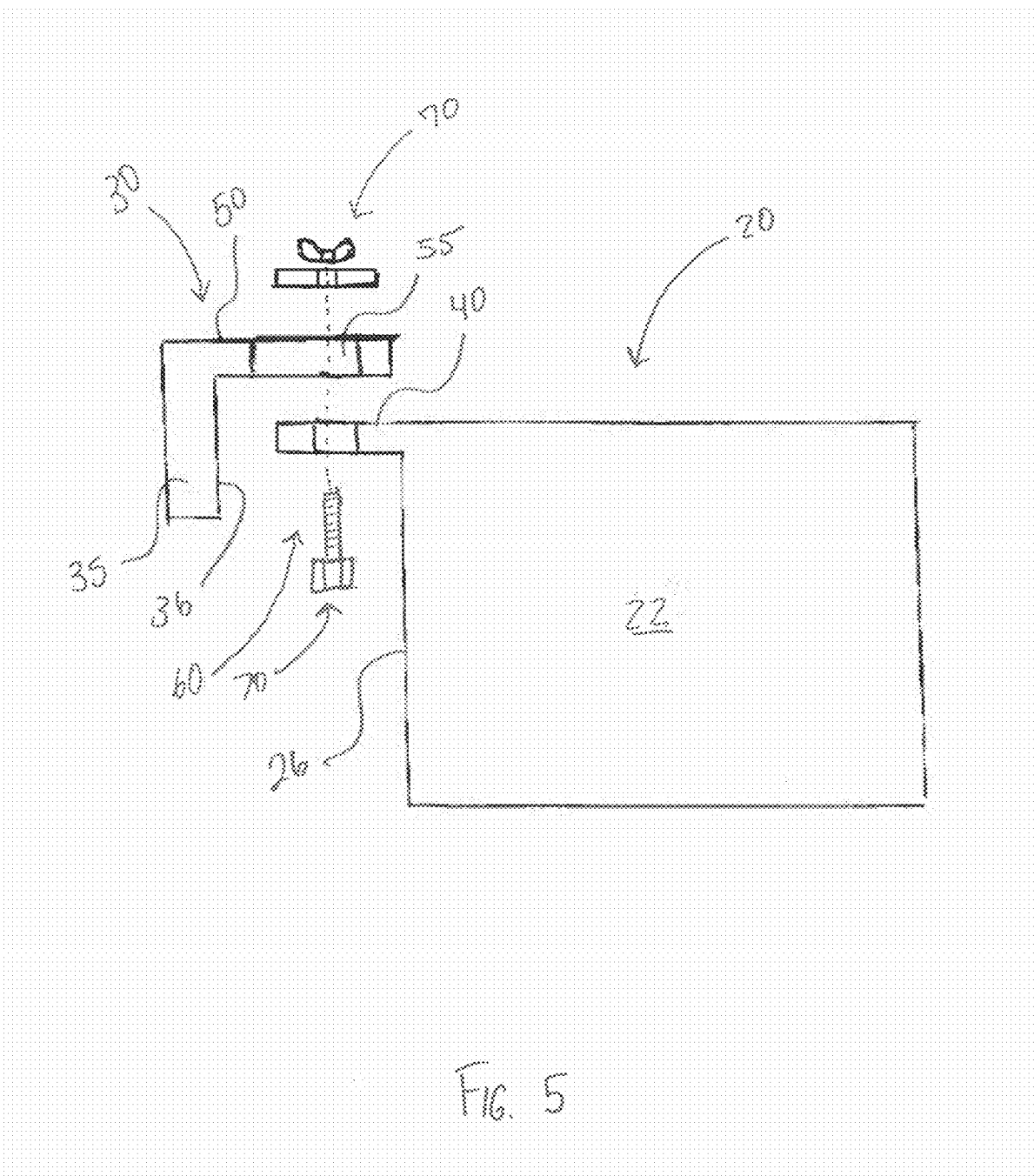

WHEEL STABILIZING ASSEMBLY FOR A PICK-UP TRUCK

FIELD OF THE INVENTION

The present invention is generally directed to a wheel stabilizing assembly that can be removably attached to a support surface, such as a wall of a pickup truck bed (e.g., the rear wall), and which includes two or more extension arms for receiving and stabilizing a wheel/tire (e.g., a front wheel/tire) of a wheeled vehicle (e.g., a motorcycle, bicycle, tricycle, etc.) for hauling the wheeled vehicle in the bed of the pickup, or other like truck.

BACKGROUND OF THE INVENTION

Transportation of a wheeled vehicle, whether motorized or manually propelled, for example, a motorcycle, trike, tricycle, bicycle, etc., in the back of a truck, such as in the bed of a pickup truck, flatbed truck etc., can oftentimes be challenging. Particularly, during transportation of a wheeled vehicle in the rear bed of a pickup truck or flatbed truck, the motorcycle or other wheeled vehicle, may shift or move, for example, to the side. This may require the driver of the truck to periodically stop and readjust the motorcycle or other vehicle to prevent the vehicle from falling or becoming damaged.

Accordingly, at least one of the wheels or tires (e.g., the front or rear wheel or tire of a motorcycle) should be stabilized such that movement of the wheel or tire, and therefore, the motorcycle, itself, in a side-to-side manner should be minimized, restricted or even prevented. Thus, there is a need in the art for a wheel stabilizing assembly that can easily attach to a support surface, such as the wall of the pickup truck bed, and receive at least a portion of the wheel or tire therein. It would be beneficial if the assembly is easy to access and easy to install when needed. For instance, the wheel stabilizing assembly should be small and easy to store when not in use.

It would also be beneficial if the proposed wheel stabilizing assembly is size adjustable to fit or removably secure or mount to truck beds and other support surfaces having different sizes, widths or dimensions. For example, many truck beds, including pickup truck beds, have side or rear walls that are different sizes than the walls of other truck beds. A universal wheel stabilizing assembly that could adjust to the different sizes of different truck bed walls would be advantageous.

SUMMARY OF THE INVENTION

The present invention is generally directed to a wheel stabilizing assembly that can be removably mountable to a support surface, such as a rear (or other) wall of a pickup truck bed and, once mounted, can be used to facilitate the hauling of a wheeled vehicle in the pick-up truck bed, for example, by engaging or receiving one or more wheels or tires for stabilization thereof. The wheeled vehicle, as used herein, can include virtually any motorized or manually operable or manually propelled vehicle including, but certainly not limited to a motorcycle or bicycle.

The wheel stabilizing assembly of at least one embodiment of the present invention includes a wheel bracket and a mounting clamp adjustably interconnected or fastened to one another. For instance, the mounting clamp and the wheel bracket are adapted to be removably mounted to a support surface, such as the wall of a pickup truck bed, wherein the wheel bracket extends into or toward the bed for receiving the wheel(s) or tire(s) of the wheeled vehicle.

For example, the wheel bracket of at least one embodiment includes a pair of extension arms and a front jaw, such that the extension arms extend out from the front jaw in a laterally spaced relation to one another defining a wheel receiving space there between. The front jaw of the wheel bracket is disposed in an facing or mating relation with the front surface of the wall or other support surface upon which the assembly is to be mounted. Furthermore, the mounting clamp of at least one embodiment includes a rear jaw disposed in a facing or mating relation with a rear surface of the wall or other support surface upon which the assembly is to be mounted. In the case where the assembly is mounted on the rear wall of a pickup truck bed, the rear jaw may fit between the rear wall of the pickup truck bed and the passenger cab of the pickup truck.

In addition, in at least one embodiment, the mounting clamp and the wheel bracket are adjustable relative to one another in order to adjust the distance between the front jaw and the rear jaw. This allows the assembly to be mounted on support surfaces (e.g., truck bed walls) having different dimensions and widths.

For example, in at least one embodiment, the mounting clamp and wheel bracket may each include a mounting plate that interconnect or fasten to one another via a fastening assembly, such as a bolt, screw, wing nut, washer, etc. At least one of the mounting plates (e.g., the mounting plate of the mounting clamp and/or the mounting plate of the wheel bracket) may include an elongated adjustment slot within which at least a portion of the fastening assembly may slide. This allows the adjustment of the mounting clamp and/or wheel bracket, and in particular the mounting space defined between the front jaw and the rear jaw, to fit the particular width or dimension of the support surface, such as, but not limited to the wall of a pickup truck bed, for example.

These and other objects, features and advantages of the present invention will become more apparent when the drawings as well as the detailed description are taken into consideration.

BRIEF DESCRIPTION OF THE DRAWINGS

FIG. 5 is a side, exploded view of the wheel/tire stabilizing assembly as disclosed in accordance with at least one embodiment of the present invention.

Like reference numerals refer to like parts throughout the several views of the drawings provided herein.

DETAILED DESCRIPTION OF THE INVENTION

Figure 1:
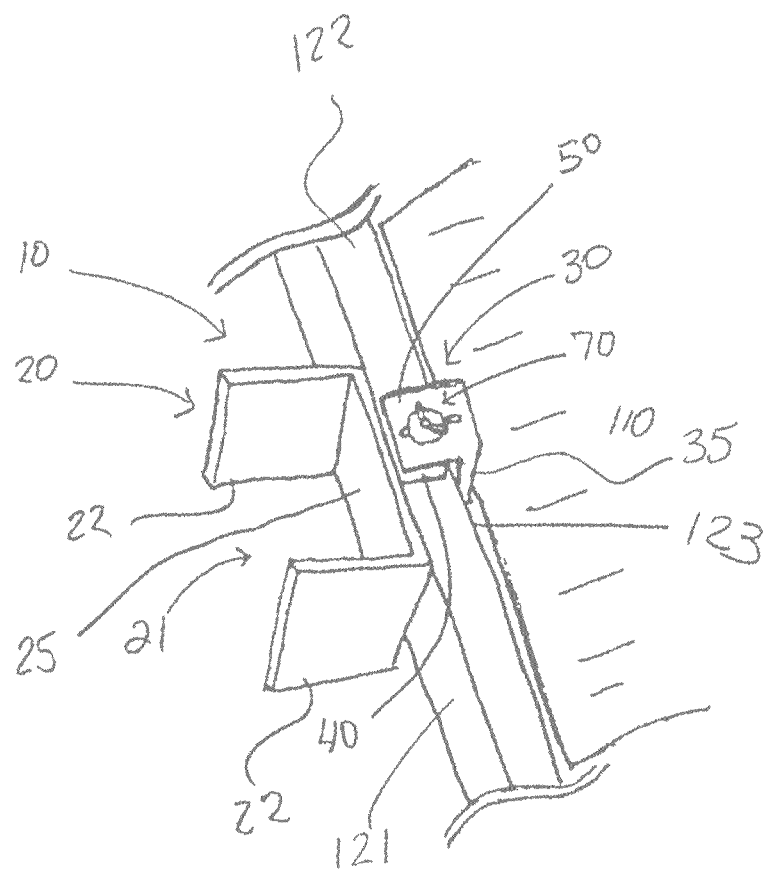
FIG. 1 is a perspective view of the wheel/tire stabilizing assembly mounted on a support surface, such as the rear wall of the bed of a pickup truck as, disclosed in accordance with at least one embodiment of the present invention.
Figure 2:
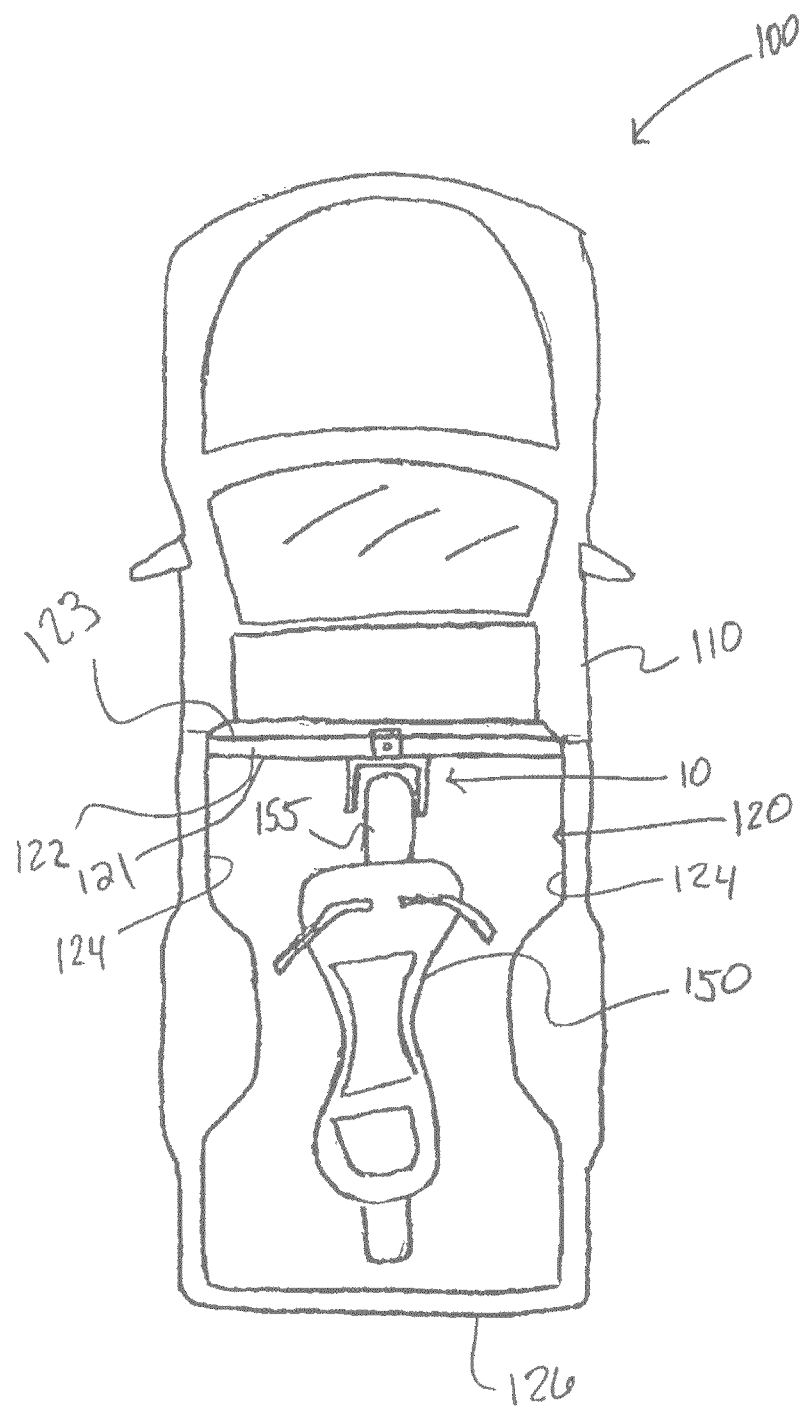
FIG. 2 is a top view of the wheel/tire stabilizing assembly mounted on the rear wall of a pickup truck as disclosed in accordance with at least one embodiment of the present invention.

As shown in the accompanying drawings, and with particular reference to FIGS. 1 and 2, the present invention is directed to a wheel stabilizing assembly, generally referenced as 10, that can be removably secured to a wall, such as a rear wall 122, of a bed 120 of a pickup truck 100. For instance, a pickup truck 100 often includes a bed 120 defined by a rear wall 122, side walls 124 and a tailgate 126. The rear wall 122 is defined as the wall immediately adjacent to the passenger cab 110 portion of the truck 100 (e.g., where the driver and passenger(s) sit). As illustrated, the rear wall 122 may also be defined as the wall opposite the tailgate 126.

In this manner, and as shown in FIG. 2, the wheel stabilizing assembly 10 of at least one embodiment of the present invention may be secured to a support surface, including but not limited to, the rear wall 122 of the bed 120 of the truck 100 in order to stabilize a wheel 155 (such as a front or rear wheel) of a wheeled vehicle 150, such as a motorcycle. It is contemplated, however, that the wheel stabilizing assembly 10 may be removably connected or mounted to other portions of the bed 100, or other support surfaces, such as one of the side walls 124 or tailgate 126.

It should also be noted that the wheeled vehicle 150 can be virtually any vehicle, whether motorized or manually operated/propelled, including but in no way limited to a motorcycle, tricycle, trike, moped, scooter, bicycle, etc. Furthermore, the truck 100 may include a pickup truck, as illustrated, or other truck or vehicle with a hauling bed 120 and a wall 122 upon which the assembly 10 of the present invention can be mounted. Other support surfaces, include a wall, brace, etc., for example, in a garage, may also be used to support the assembly 10 of certain embodiments of the present invention.

In any event, and with reference to FIGS. 3 through 6B, the wheel stabilizing assembly 10 of at least one embodiment includes a wheel bracket 20 and a mounting clamp 30 adapted to be removably secured or mounted to the support surface, such as the bed 120 or wall 122 of a truck 100, such as a pickup truck. The wheel stabilizing assembly 10, and in particular, the wheel bracket 20 and/or mounting clamp 30, thereof, may be constructed of a rigid and durable material including, but in no way limited to plastic, plastic molding, injection molding, metal, aluminum, steel, etc.

Furthermore, as shown in the drawings, the wheel bracket 20 includes a pair of extension arms 22 disposed in a laterally spaced relation to one another, and defining a wheel receiving portion or space 21 there between. In some embodiments, for example, as illustrated, the extension arms 22 are constructed of a substantially flat, planar configuration, such as a solid wall extending outward and defining the wheel receiving space 21 in between. However, other configurations of the arms 22 are contemplated within the scope of the present invention to accomplish or create a space 21 within which a wheel 155 or tire of a vehicle 150 can be disposed and stabilized. Furthermore, the distance between the two arms 22 may vary to accommodate different types of vehicles 155 (e.g., motorcycles, trikes, bicycles, etc.) with wheels 155 or tires having different widths. As just an example, however, the width between the two arms 22, and in particular the width of the wheel receiving space 21 may be approximately five (5) inches, although other widths and dimensions are certainly included in the scope of the present invention.

Furthermore, although not shown in the drawings, certain embodiments of the present invention may include arms 22 that may be adjusted or moved in order to change or customize the width of the wheel receiving region or space 21. For instance, one or both of the arms 22 may be adjustable inward and/or outward to decrease and/or increase the width or distance between the arms 22, and therefore, the width of the wheel receiving space 21.

In addition, the assembly 10 of at least one embodiment includes two jaws 25, 35 which function to clamp against the support surface or wall, such as the back or rear wall 122 of the truck or other vehicle 100. For instance, in one embodiment, the mounting clamp 30 includes a rear jar 35 with a mounting surface 36 that is selectively positionable in a securely abutting or clamping relation with a rear surface 123 of the wall (e.g., rear wall 122) of the pickup (or other) truck bed 120. For instance, as shown in FIG. 1, in the embodiment where the assembly 10 is secured to rear wall 122 of a pickup truck bed, the mounting clamp 30, and in particular, the rear jaw 35 thereof, may fit between the rear wall 122 of the pickup (or other) truck bed 120 and the passenger cab 110 of the pickup truck 100. Accordingly, the rear jaw 35 of at least one embodiment may be constructed of a size or thickness that will allow it to fit between the wall 122 of the bed 120 and the passenger cab 110. For example, in one embodiment, the thickness of the rear jaw 35 may be approximately 0.5 inches, although other dimensions larger or smaller are contemplated within the full spirit and scope of the present invention.

More in particular, in at least one embodiment, the wheel bracket 20 includes one or more mounting surfaces 26 which are selectively positionable in a securely abutting or clamping relation with the support surface, such as, but not limited to, a front surface 121 of the wall (e.g., rear wall 122) of the pickup truck bed 120. In this manner, the wheel bracket 20 and the mounting clamp 30 cooperatively squeeze or clamp onto the support surface, such as the wall 122, for example, via front a rear jaws 25, 35 and/or via cooperatively structured and disposed mounting surfaces 26, 36.

Particularly, with reference briefly to FIG. 5, the mounting clamp 30 and the wheel bracket 20 define a mounting space 60 there between, and specifically, between the mounting surfaces 26, 36 thereof and/or between the front and rear jaws 25, 35. The support surface upon which the assembly is mounted, such as the wall, for example, the rear wall 122 of the pickup truck bed 120, can be disposed within this mounting space 60. As shown, the mounting space 60 can be considered a substantially "U" shaped configuration (or an upside down "U" shaped configuration) at least partially defined by certain portions of the mounting clamp 30, such as the rear jaw 25 or mounting surface(s) 26, and certain portions of the wheel bracket 20, such as the front jaw 35 or mounting surface(s) 36. As described in accordance with some embodiments of the present invention, the mounting space 60 may be size adjustable, such that the distance between the mounting surfaces 26, 36 or front and rear jaws 35, 25 may be adjusted to fit different sized walls, and in particular, walls that have different widths.

Figure 3:
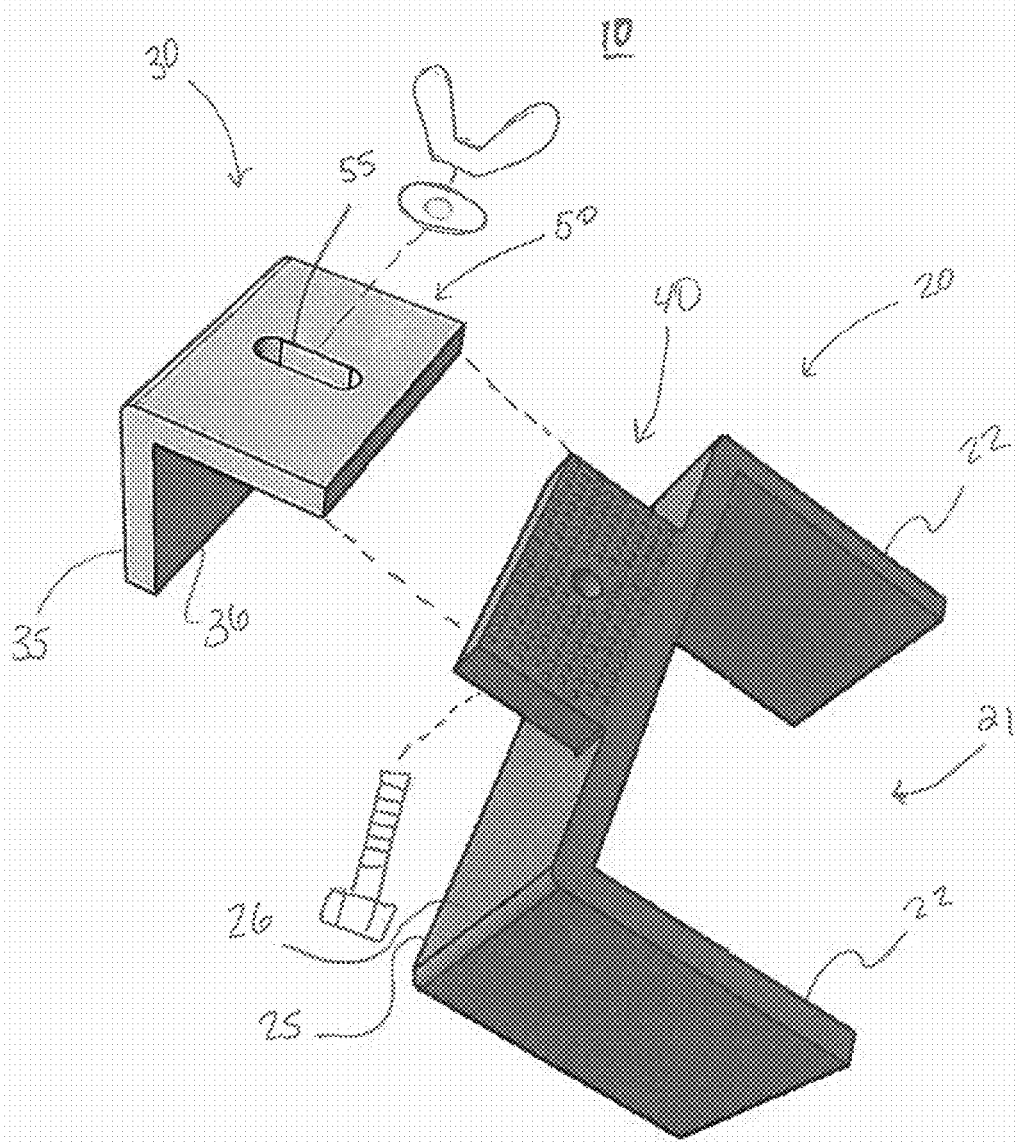
FIG. 3 is a perspective, exploded view of the wheel/tire stabilizing assembly as disclosed in accordance with at least one embodiment of the present invention.

Furthermore, with reference to FIG. 3, for example, the mounting clamp 30 and/or wheel bracket 20 include a mounting plate 40, 50 which secure the mounting clamp 30 to the wheel bracket 20. For instance, in at least one embodiment of the present invention, the mounting clamp 30 is movably positionable or adjustable relative to the wheel bracket 20 in order to adjust the size or width of the (upside down) U-shaped mounting space 60. Particularly, in one embodiment, the mounting clamp 30 may be moved toward and/or away from the wheel bracket 20 in order to adjust the size of the mounting space 60.

This can be accomplished in a number of different ways, for example, by having the mounting plate 50 of the mounting clamp 30 disposable between an adjustable relation and a fastened relation relative to the wheel bracket 20. For example, a fastening assembly 70 (e.g., a bolt, screw, wing nut, washer, etc.) can pass through the mounting plates 40, 50 and be fastened tight or loosened. In at least one embodiment, an elongated adjustment slot 55 may be used to slidably adjust or slidably position the mounting clamp 30 and/or wheel bracket 20 relative to one another while the fastening assembly 70 is disposed between or through the mounting plates 40, 50. Specifically, in the embodiment shown, the elongated adjustment slot 55 is disposed on the mounting clamp 30, and in particular, through the mounting plate 50 of the mounting clamp 30. In other embodiments, the elongated adjustment slot 55 could be on the wheel bracket 20, or through the mounting plate 40 of the wheel bracket 20.

In any event, with reference to FIGS. 3 and 5, the fastening assembly 70, or at least a portion of the fastening assembly 70, such as a bolt or other elongated like device or mechanism, may be passed through the mounting plates 40, 50 of the wheel bracket 20 and mounting clamp 30. The elongated adjustment slot 55 allows the mounting clamp 30 to be slidingly positionable relative to the wheel bracket 20, for instance, as the fastener 70 slides within the slot 55. Accordingly, when the mounting space 60 matches the width of the wall 122, the fastening assembly 70 may be tightened, thereby clamping the jaws 25, 35 onto the respective surfaces of the wall 122.

In most cases, the fastening assembly 70 will be loosened to allow the mounting clamp 30 to be slidingly adjusted, and then the assembly 10 will be placed over the wall 122 or other support surface such that the arms 22 of the wheel bracket 20 face outward toward the inside of the bed 120. The user or operator will then squeeze the mounting clamp 30 and the wheel bracket 20 toward one another thereby engaging or mating against the respective surfaces of the wall 122 or support surface. The fastener assembly 70 can then be tightened, and the assembly 10 is then secured in place, ready for use.

Figure 6A:
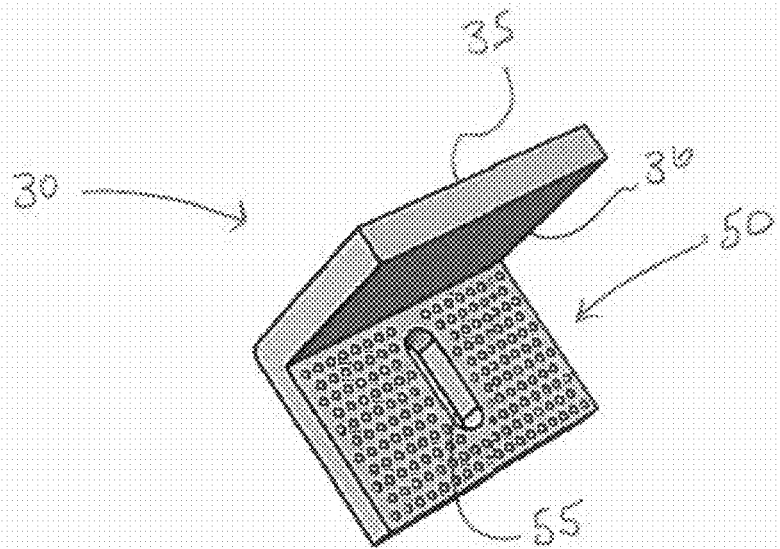
FIG. 6A is a bottom perspective view of the mounting clamp as disclosed in accordance with at least one embodiment of the present invention.
Figure 6B:
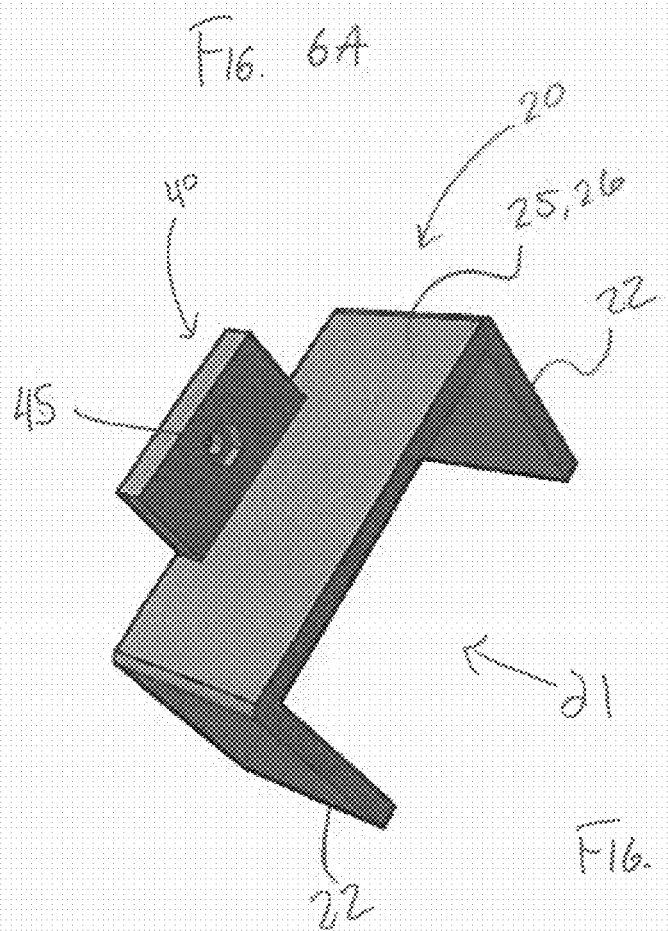
FIG. 6B is a bottom perspective view of the wheel bracket as disclosed in accordance with at least one embodiment of the present invention.

With reference to the bottom view of the wheel bracket 20 as shown in FIG. 6B, the underside of the hole 45 may include a recessed portion adapted to receive the head of the fastener (e.g., bolt, screw, etc.) of the fastening assembly 70. In some cases, the fastener may be a bolt or screw with a hexagonal head, wherein the recess on the underside of the mounting plate 40 include a cooperatively structured hexagonal configuration structured to receive the head of the fastener therein and to restrict rotational movement of the fastener. This makes is easy to tighten the fastening assembly 70 (e.g., by screwing on a top fastener such as a wing nut) without having to stabilize the rotational movement of the fastener.

Figure 4:
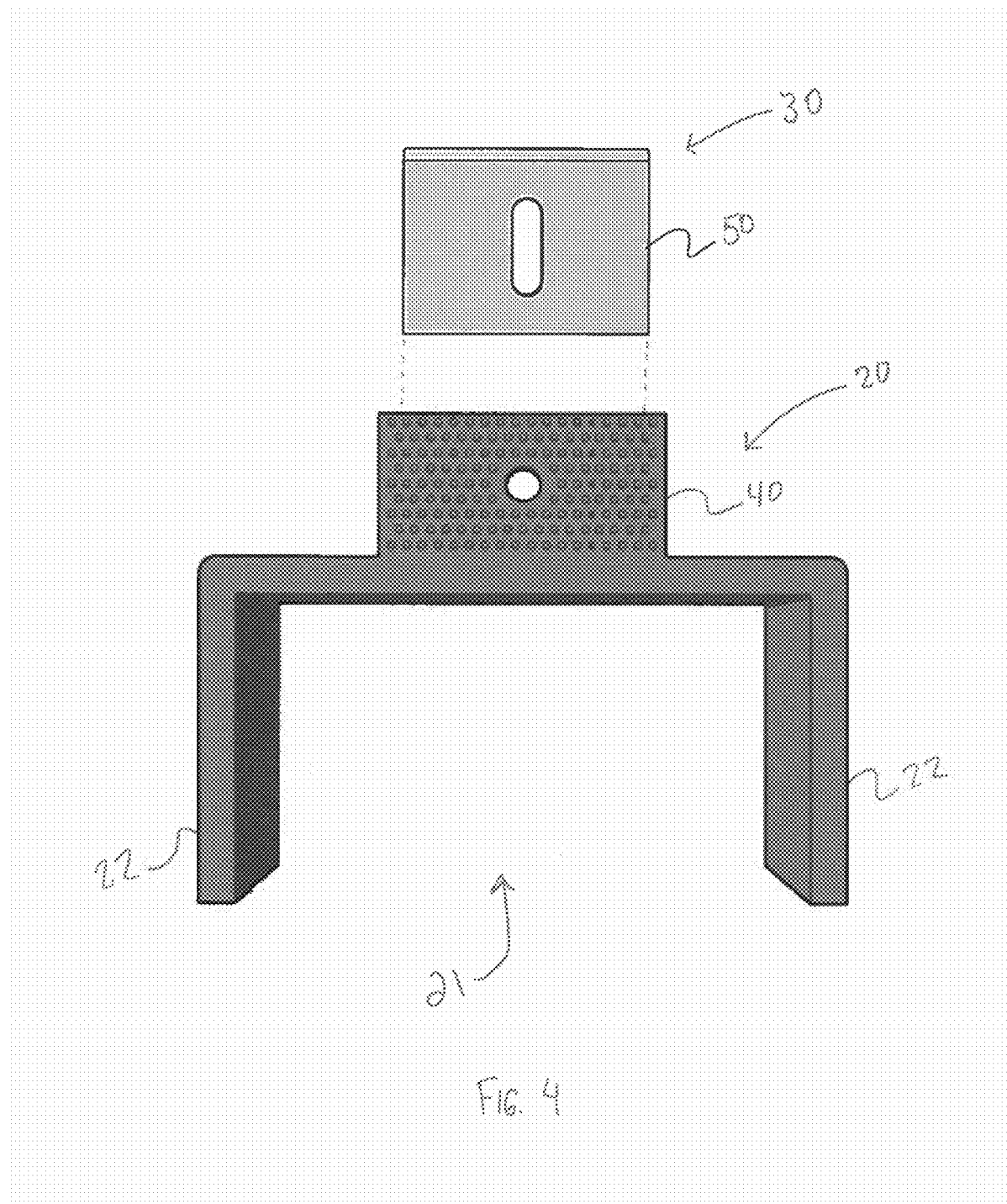
FIG. 4 is a top, exploded view of the mounting clamp and wheel bracket of the wheel/tire stabilizing assembly as disclosed in accordance with at least one embodiment of the present invention.

Furthermore, as shown in FIGS. 4 and 6A, mating surfaces of the mounting plates 40, 50 of at least one embodiment may include gripping elements disposed thereon in order to facilitate a gripped engagement there between. For instance, in the embodiment shown, the top or upper surface of mounting plate 40, and the lower or bottom surface of mounting plate 50 include one or more gripping elements disposed thereon. The gripping elements may be a plurality of raised bumps or projections. Some embodiments may include a rubber or like coating or covering as part of the gripping elements. Other gripping elements structured to facilitate the practice of the present invention in the intended manner are contemplated.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described.

What is claimed is:

1. A wheel stabilizing assembly removably mountable to a wall of a pick-up truck bed for hauling a wheeled vehicle in the pick-up truck bed, said wheel stabilizing assembly comprising:
    a wheel bracket and a mounting clamp, said wheel bracket and said mounting clamp comprising separate pieces adjustably connectable to one another,
    said wheel bracket integrally comprising a pair of extension arms, a front jaw, and a mounting plate,
    said pair of extension arms extending outward from said front jaw and disposed in a laterally spaced relation to one another defining a wheel receiving space there between,
    said mounting plate of said wheel bracket extending rearward from an upper end of said front jaw,
    said mounting clamp integrally comprising a rear jaw and a mounting plate,
    said mounting plate of said mounting clamp and said mounting plate of said wheel bracket each comprising a hole disposed there through, wherein a surface of said mounting plate of said mounting clamp abuts against a surface of said mounting plate of said wheel bracket to at least partially vertically align said holes with one another, and
    wherein said front jaw defines a mounting surface of said wheel bracket and said rear jaw defines a mounting surface of said mounting clamp, said front jaw and said rear jaw defining a mounting space there between.

2. The wheel stabilizing assembly as recited in claim 1 wherein said pair of extension arms comprise substantially flat planar walls extending outward from said front jaw of said wheel bracket.

3. The wheel stabilizing assembly as recited in claim 1 wherein said rear jaw of said mounting clamp and said front jaw of said wheel bracket are structured to define an at least substantially U-shaped mounting space there between.

4. The wheel stabilizing assembly as recited in claim 1 wherein said mounting space is size adjustable to securely fit the wall of the pick-up truck bed.

5. The wheel stabilizing assembly as recited in claim 1 wherein said mounting plate of said mounting clamp is disposable between an adjustable relation and a fastened relation relative to said mounting plate of said wheel bracket.

6. The wheel stabilizing assembly as recited in claim 5 wherein said mounting clamp is slidably positionable relative to said wheel bracket when said mounting plate of said mounting clamp is disposed in said adjustable relation relative to said mounting plate of said wheel bracket in order to adjust said mounting space between said front jaw and said rear jaw.

7. The wheel stabilizing assembly as recited in claim 6 further comprising a fastening assembly structured to fasten said mounting clamp to said wheel bracket.

8. The wheel stabilizing assembly as recited in claim 7 wherein said holes of at least one of said mounting plate of said mounting clamp and said mounting plate of said wheel bracket comprises an elongated adjustment slot through which at least a portion of said fastening assembly is disposed.

9. The wheel stabilizing assembly as recited in claim 8 wherein said elongated adjustment slot is adapted to allow said mounting clamp to be slidingly positionable relative to said wheel bracket as said fastener slides within said elongated adjustment slot.

10. The wheel stabilizing assembly as recited in claim 9 wherein at least one of said mounting plate of said mounting clamp and said mounting plate of said wheel bracket comprises gripping elements disposed on mating surfaces thereof.

11. The wheel stabilizing assembly as reciting in claim 8 wherein said gripping elements comprise a plurality of raised projections disposed on said mating surfaces.

12. A wheel stabilizing assembly removably mountable to a rear wall of a pick-up truck bed for hauling a wheeled vehicle in the pick-up truck bed, the rear wall of the pick-up truck bed being adjacent the pick-up truck passenger cab, said wheel stabilizing assembly comprising:
　a wheel bracket and a mounting clamp, said wheel bracket and said mounting clamp comprising separate components, said mounting clamp adapted to mount said wheel bracket to the rear wall of the pick-up truck bed,
　said wheel bracket comprising two extension arms, a front jaw, and a mounting plate, each of said two extension arms extending outward from said front jaw in a laterally spaced relation to one another defining a wheel receiving space there between,
　said mounting clamp comprising a rear jaw and a mounting plate, said rear jaw disposable between the rear wall of the pick-up truck bed and the passenger cab such that a mounting surface of said rear jaw is positionable in a facing relation with a rear surface of the rear wall of the pick-up truck bed,
　said mounting plate of said mounting clamp and said mounting plate of said wheel bracket each comprising a hole disposed there through, wherein said mounting plate of said mounting clamp and said mounting plate of said wheel bracket each comprise a surface that are adjustably mated with one another while said holes are at least partially aligned,
　wherein said front jaw of said wheel bracket comprises a mounting surface positionable in a facing relation with a front surface of the rear wall of the pick-up truck bed, and
　said mounting clamp and said wheel bracket being movably adjustable relative to one another to define an adjustable distance between said rear jaw and said front jaw.

13. The wheel stabilizing assembly as recited in claim 12 wherein said mounting plates are slidably positionable relative to one another to define said adjustable position between said rear jaw and said front jaw.

14. The wheel stabilizing assembly as recited in claim 12 wherein said hole of at least one of said mounting plate of said mounting clamp and said mounting plate of said wheel bracket comprises an elongated slot through which at least a portion of a fastening assembly is disposed.

15. The wheel stabilizing assembly as recited in claim 14 wherein at least one of said mounting plates comprises gripping elements disposed thereon.

16. The wheel stabilizing assembly as reciting in claim 15 wherein said gripping elements comprise a plurality of raised projections.

17. The wheel stabilizing assembly as recited in claim 12 wherein said mounting plate of said mounting clamp is disposed in an overlying, adjoining relation with said mounting plate of said wheel bracket.

18. The wheel stabilizing assembly as recited in claim 17 wherein said mounting plate of said mounting clamp comprises an elongated slot disposed there through and said mounting plate of said wheel bracket comprises a hole there through, wherein said hole is at least partially aligned with said elongated slot when said mounting plate of said mounting clamp is disposed in said overlying, adjoining relation with said mounting plate of said wheel bracket.

19. A wheel stabilizing assembly removably mountable to a wall of a pick-up truck bed for hauling a motorcycle in the pick-up truck bed, said wheel stabilizing assembly comprising:
　a wheel bracket and a mounting clamp, said wheel bracket and said mounting clamp comprising separate pieces adjustably connectable to one another, said mounting clamp adapted to removably mount said wheel bracket to the wall of the pick-up truck bed,
　said wheel bracket comprising a pair of extension arms, a front jaw, and a mounting plate, said pair of extension arms extending outward from said front jaw and disposed in a spaced relation to one another defining a wheel receiving space there between, said wheel receiving space being adapted to receive a wheel of the motorcycle therein to support the motorcycle in an upright position in the pick-up truck bed,
　said mounting clamp comprising a rear jaw and a mounting plate,
　wherein the entire distance between said front jaw and said rear jaw is occupied by the wall of the pick-up truck when said mounting clamp and said wheel bracket are mounted to the wall of the pick-up truck, and
　said mounting plate of said mounting clamp and said mounting plate of said wheel bracket each comprising a hole disposed there through, wherein said mounting plate of said mounting clamp and said mounting plate of said wheel bracket are disposed in an adjoined relation to one another in a position wherein said holes are at least partially vertically aligned with one another.

\* \* \* \* \*